April 16, 1929.  M. J. REINHARD  1,709,488
LIFE SAVING DEVICE
Filed March 14, 1927  7 Sheets-Sheet 1

Fig. 1.

Inventor
Martin J. Reinhard
By Erich H. Michaelis
Attorney.

April 16, 1929.   M. J. REINHARD   1,709,488
LIFE SAVING DEVICE
Filed March 14, 1927   7 Sheets-Sheet 4

Inventor
Martin J. Reinhard
By Erich J. Michaelis
Attorney.

April 16, 1929.  M. J. REINHARD  1,709,488
LIFE SAVING DEVICE
Filed March 14, 1927  7 Sheets-Sheet 5

Inventor
Martin J. Reinhard
By Erich H. Michaelis
Attorney

April 16, 1929. M. J. REINHARD 1,709,488
LIFE SAVING DEVICE
Filed March 14, 1927 7 Sheets-Sheet 7

Inventor
Martin J. Reinhard
By Erich H. Michaelis
Attorney

Patented Apr. 16, 1929.

1,709,488

UNITED STATES PATENT OFFICE.

MARTIN J. REINHARD, OF CHICAGO, ILLINOIS, ASSIGNOR OF ONE-HALF TO JULIANNE F. REINHARD, OF CHICAGO, ILLINOIS.

LIFE-SAVING DEVICE.

Application filed March 14, 1927. Serial No. 175,110.

The invention relates to life saving devices and especially to devices of that type used on sea going vessels. The object of the invention is to provide a device adapted to be permanently but detachably fastened to a boat and able to receive a comparatively great number of people.

A further object of the invention is to provide a life saving device which will be adapted to rise by its own buoyancy, if the boat to which said apparatus is attached should sink.

A still further object of the invention is to provide a life saving device which is adapted to be released from a boat, to which it is attached even if said boat should rest on its side, after being sunk.

Other objects not specifically mentioned will be easily ascertained and understood from the following description and from the drawings forming a part thereof.

In the drawings a preferred embodiment of the invention is shown. It is however to be understood that the invention is not to be limited or restricted to the exact construction shown in the drawings and described in the following specification, but that such changes and alterations may be made as fall into the scope of the claims appended hereto.

Figure 2:
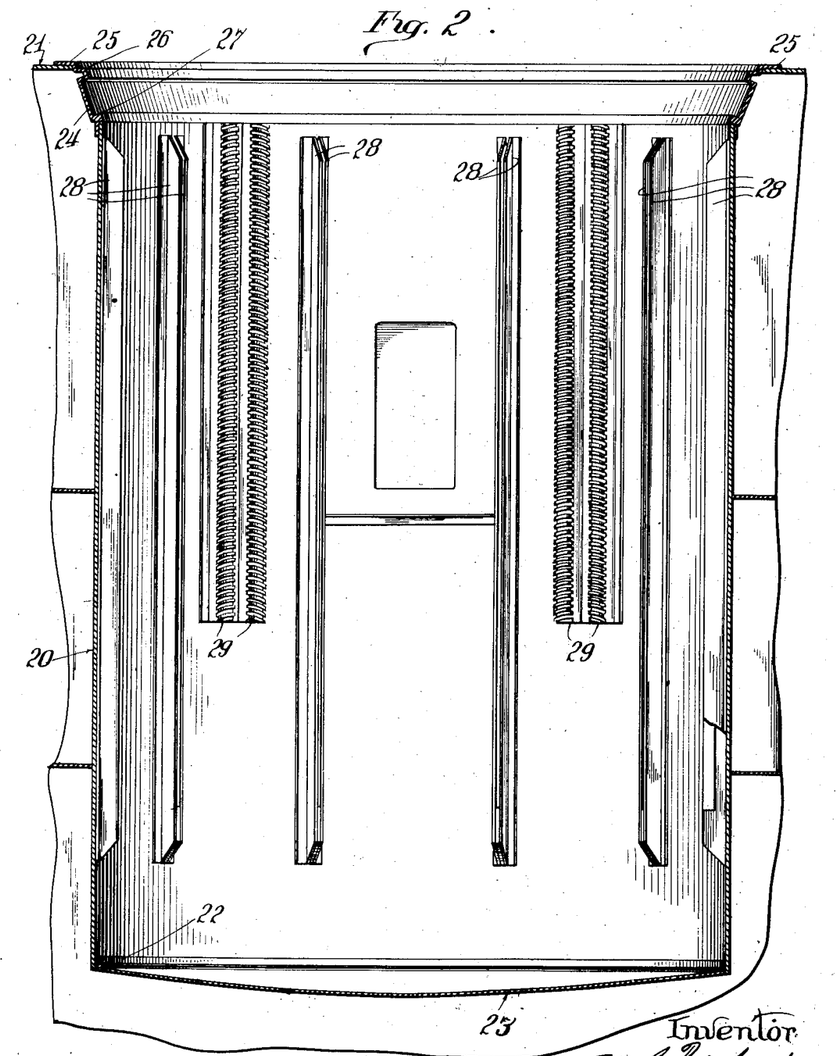
Figure 2 is a vertical cross section through a housing adapted to receive and hold the life saving device until the same is being used; said housing is built into the boat and permanently connected therewith.
Figure 4:
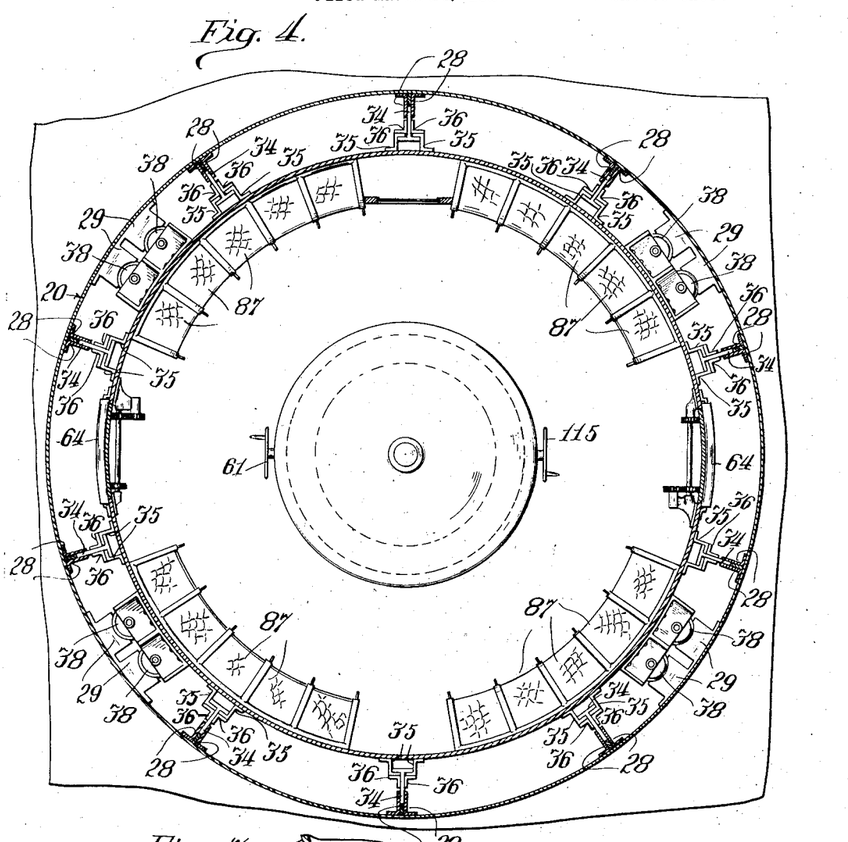
Figure 4 is a horizontal section on line 4—4 of Figure 3.

The life saving device according to the present invention is to be carried permanently on boats especially on sea going vessels and for this purpose arrangements have to be made on the boat for housing one or more of such devices. Preferably the life saving device has a substantially cylindrical form. It is however to be understood that said devices may be given any other desired shape. In this specification the life saving device as well as the housing are indicated as having cylindrical shape. The housing is shown in section in Figure 2 and has a cylindrical body 20 which is built into the boat and extends from the top deck indicated at 21 of said boat downwardly. The boat construction does not constitute any part of the present invention and will therefore not be described. In the drawings such parts of the boat as are located adjacent the life saving device are indicated. At the bottom edge of the cylindrical body 20 of the housing a ring 22 is fastened, which is preferably made of angle iron, to connect a dish shaped bottom 23 with the body 20. A ring 24 is fastened to the top of the body 20 of the housing and is shaped in such a manner that a top flange 25 will rest on the top deck 21 of the boat and hold the casing in position. As indicated in the drawings the housing may extend through one or more lower decks of the boat and in that case some other desirable connections between the cylindrical body of the housing and said decks may be arranged (not shown). The top ring 24 has a circular ledge 26 extending inwardly and upwardly from said ring and a second ledge 27 also extending inwardly. The inner surfaces of said ledges extend gradually downwardly and inwardly and are located in a common plan for a purpose later to be explained. In order to hold the life saving device in position while the same is not in use and in order to guide said device while it is being released, angle irons 28 are fastened in pairs on the inner surface of the cylindrical body of the housing. In the drawings (Figure 4) 10 such pairs of angle irons are shown. It is however to be understood that any desired number of such guide angles may be used.

In addition to said guide angles racks 29 are fastened on the inner circumference of the housing for a purpose also later to be explained. Said racks as well as the guide angles extend axially of the cylindrical housing and the racks are provided with worm thread.

Figure 1:
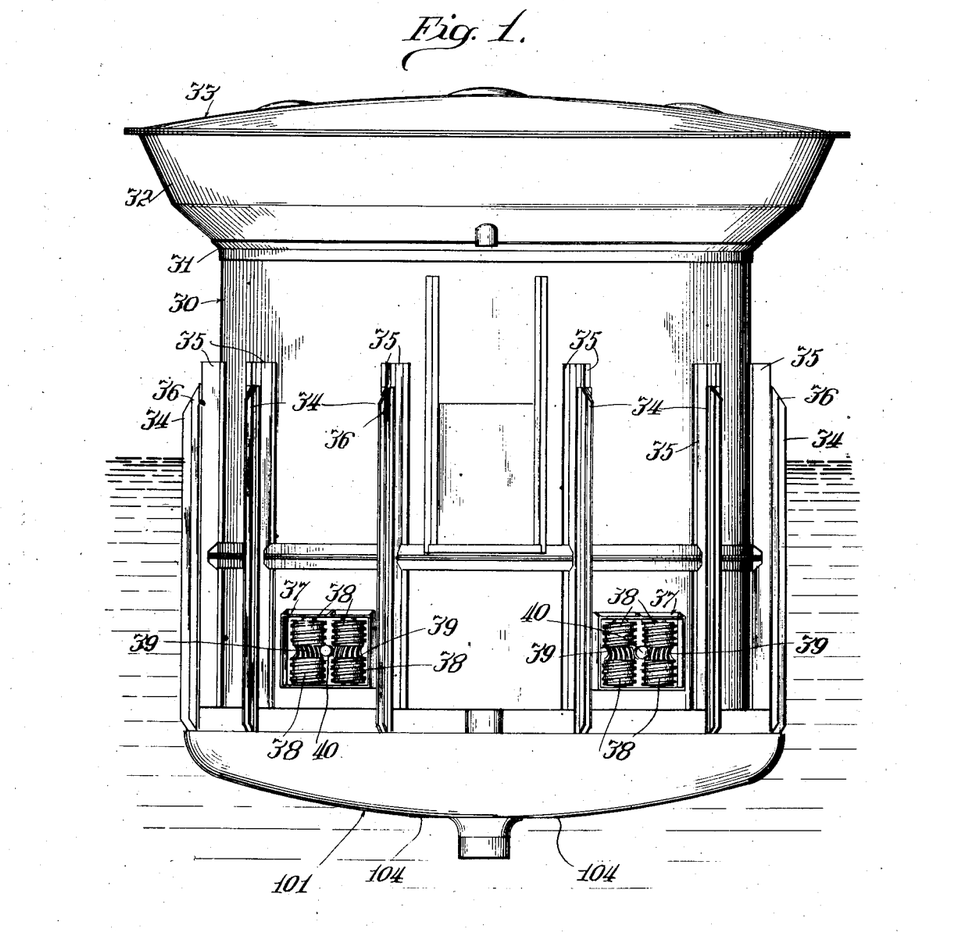
Figure 1 is an elevation of the life saving apparatus.
Figure 3:
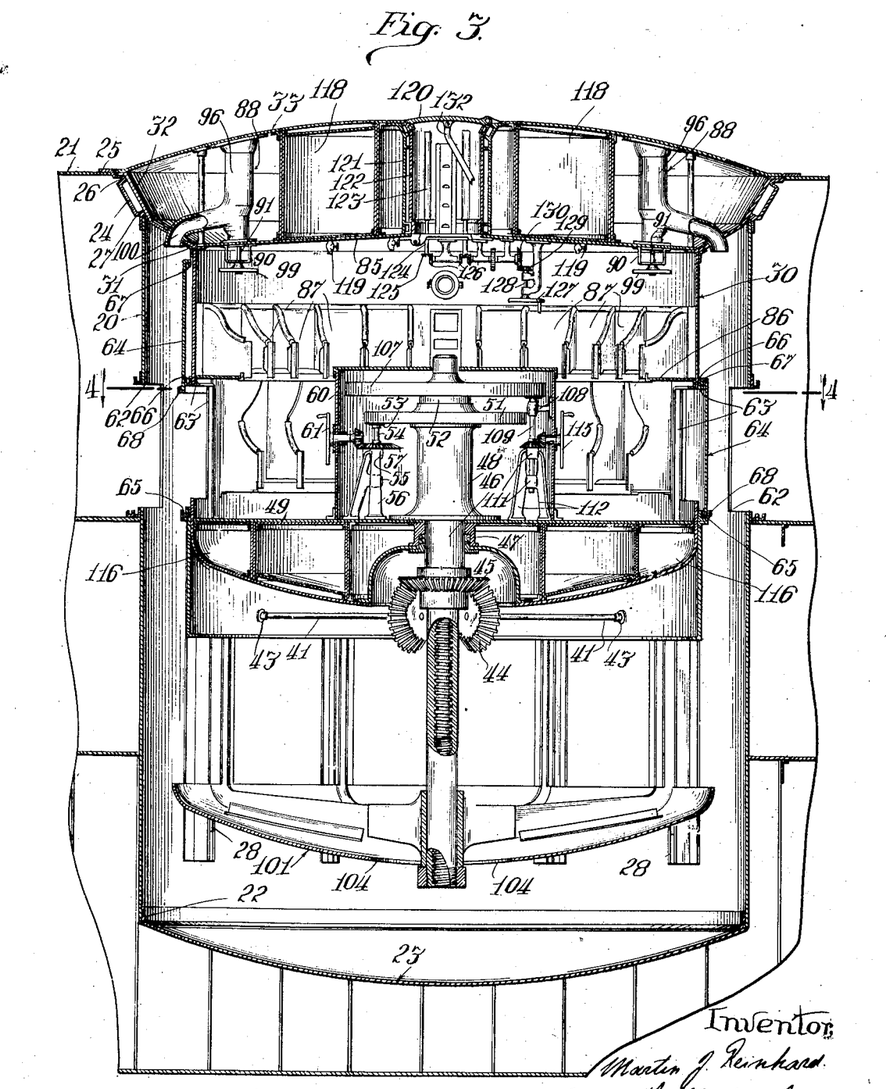
Fig. 3 is a vertical central section through the life saving device and its housing.
Figure 7:
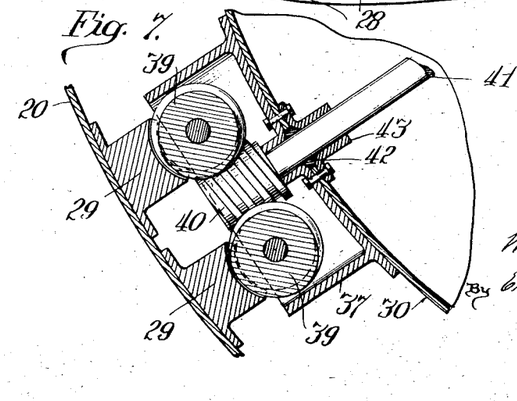
Figure 7 is a detail view showing the mechanism utilized for releasing the life saving device from the housing.

Figure 1 shows an elevation of the life saving device and Figure 3 a vertical section thereof. This device has a cylindrical body 30 of a diameter smaller than the inside diameter of the cylindrical body of the housing as clearly shown in Figure 3. The body 30 of the life saving device has at its upper end a ring 31 connecting a flange 32 with the body. This flange extends from the body upwardly and outwardly and ends in a horizontal part. A top cover 33 is fastened to this horizontal part and forms the real upper cover of the life saving device. The circumferential portion of said cover 33 and the horizontal part are adapted to rest on the horizontal upper surface of the ledge 26 while a portion of the outwardly and an upwardly extending part of the top flange rests on the inner surfaces of the ledges 26 and 27 thereby getting two good carrying surfaces. To the outer circumference of the circular body 30 guides 34 are fastened to co-operate with the guide angles 28 of the housing 20. To fasten the guides 34 to the life saving device Z-shaped bars 35 are attached in pairs to the mantel of the life saving device and the guides 34 are preferably made from T iron as plainly shown in Figure 4. To the outer flanges of the Z-bars 35 and to the radially extending leg of the T bars 34 angle irons 36 are fastened, so that when the life saving device is in position inside of the housing the guide bars 34 extend between the angles 28 and the radially extending legs of the angles 36 nearly abut the guide angles 28. In this manner the life saving device is prevented from moving in the housing and from rattling therein. Boxes 37 are fastened to the outer surface of the mantel 30 of the life saving device and in said boxes, which are open on the outside, pairs of worm gears 38 are journaled. Figure 1 shows that each worm gear really consists of two worm gears, between which a third worm gear 39 is arranged. The worm gear 38 is as shown in Figure 1 journaled in the upper and lower walls of the boxes 37. The thread of the two worm gears would impart upward and downward movement respectively to the life saving device relative to the casing. The thread of the third worm gear 39 stands at right angles to the thread of the worm gear 38 and a worm 40 meshes with the thread of the worm gears 39. The shafts 41 of the worms 40 extend through openings in the mantel 30 of the life saving device and as shown in Figure 7 a packing 42 is provided to prevent leakage of water or the like on this place. Said packing is held in place by a ring 42. In the drawings 4 pairs of racks 29 are shown and a corresponding number of worm gears 38. In consequence 4 worm gears 40 and shafts 41 are shown. It is however to be understood that any desired number of driving shafts 41 and racks and worm gears may be used.

Figure 8:
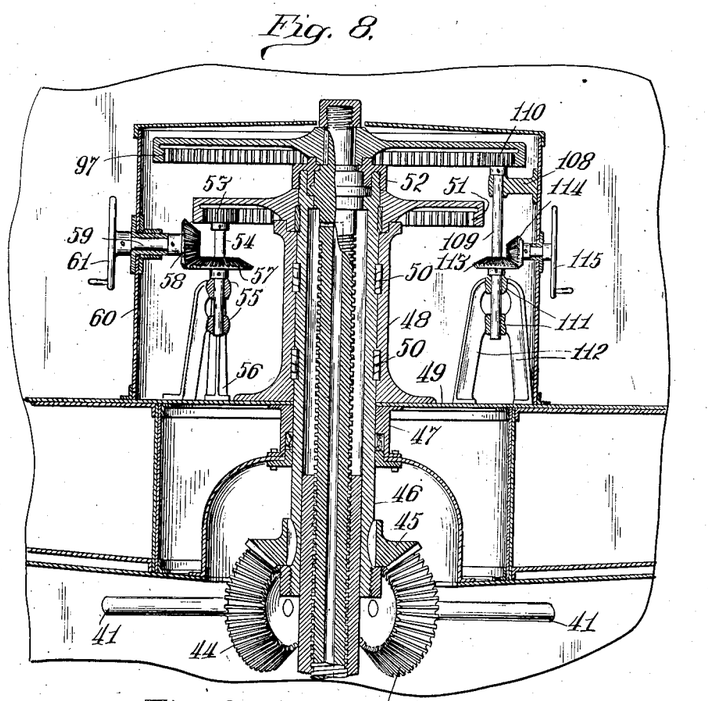
Figure 8 is a detail view showing the driving mechanism for releasing the life saving device from the housing and the mechanism for retarding at will the velocity with which life saving device will rise in the water after being released from the boat.

On the inner end of the shaft 41 a bevel gear 44 is mounted which meshes as shown in Figures 3 and 8 with a bevel gear 45. This gear 45 is rigidily fastened to a hollow shaft 46 journaled in bearings 47 and 48. A plate 49 extends crosswise through the interior of the life saving device and this plate actually forms the bottom or the flooring of the life saving chamber. The bearing 48 is fastened on top of this plate 49 and extends upwardly therefrom, while the bearing 47 is fastened on the lower surface of the plate 49 and extends downwardly therefrom. In order to prevent the hollow shaft 46 from sliding in said bearings rings 50 are inserted in grooves provided therefor in the adjacent faces of the bearing 48 and of the hollow shaft 46. An internal gear 51 is rigidly mounted on the hollow shaft adjacent the upper end thereof and a cap 52 is screwed onto the end of said shaft permitting removal of the internal gear but preventing accidental movement thereof. A gear 53 meshes with the internal gear 51 and is mounted on a shaft 54 journaled in bearings 55 supported by standards 56 resting on the floor plate 49. Between the bearing 55 and the gear 53 a beveled gear 57 is mounted on the shaft 54 and meshes with a second bevel gear 58. The second bevel gear 58 is mounted on a horizontal shaft 59 extending through the wall 60 of a casing fastened to the flooring 49 and surrounding the mechanism described so far and some mechanism to be described later. On the other end of the shaft 59 outside of the wall 60 a hand-wheel 61 is fastened. It is evident that, when this hand-wheel 61 is rotated, the worm gears 38 will be set in motion through the shaft 59 beveled gear 58, bevel gear 57, shaft 54, gear 53, internal gear 51, hollow shaft 48, bevel gear 45, bevel gears 44, shafts 41, bevel gears 40, and bevel gears 39. It is also to be understood that it is not necessary to actuate the train of gears by means of a hand-wheel, as indicated in the description and drawings, but that other means may be used. For instance, in case the apparatus is built big enough to provide for a storage battery, electric power may be used to actuate this mechanism.

Figure 12:
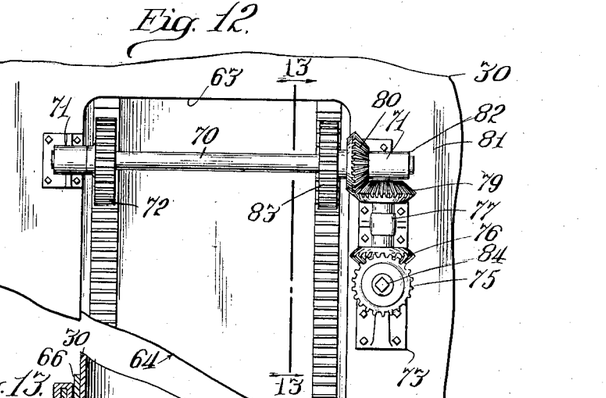
Figure 12 is a detail view of the mechanism for opening and closing the entrance doors to the life saving device and Figure 13 is a section on line 13—13 of Figure 12.
Figure 13:
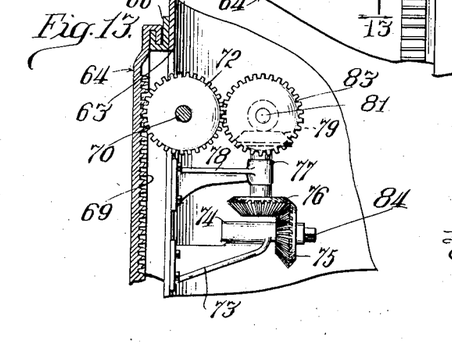

Door openings 62 are provided in the casing 20 and openings 63 in mantel 30 of the life saving device. Vertically sliding doors 64 are adapted to close these door openings. On the lower end of the door opening a channel 64 is fastened and above the door opening a second channel 66 is provided. On the upper edge of the door 65 a hook shaped portion 67 is provided, and when the door is in its lowermost position, as shown in the right hand side of Figure 3, this hook shaped portion of the door will engage the upper channel 66. On the lower edge of the door a hook shaped part 68 is provided and when the door is closed the outer flange of the channel 65 will be located between the door proper and this hook shaped part 68. Some packing may be provided in the channels, so that, when the door is forced into closed position a tight closure is provided. In order to force the door into closed position, gear racks 69 are provided on the inner surface of the door 64 as shown in Figures 12 and 13. A shaft 70 is journaled at 71 on the inner side of the mantel 30 of the life saving device, and gears 72 are mounted on said shaft and mesh with the racks 69. At one side of the doorway a bracket 73 is fastened and carries a bearing 74, in which the shaft of a bevel gear 75 is journaled. This bevel gear meshes with a second gear 76 the shaft whereof is journaled in a bearing 77 carried by a bracket 78 which is mounted above the bracket 73. On the upper end of the shaft carrying the bevel gear 76 another bevel gear 79 is mounted and meshes with a bevel gear 80. The shaft 81 of this bevel is journaled in the bearing 82 connected with one of the bearings 71 mentioned above. On the shaft 81 a gear 83 is mounted and meshes with one of the gears 72. The shaft of the bevel gear 75 has a rectangular end 84 extending beyond the bevel gear 75 and adapted to receive a crank. The above described train of gears may be set in motion to lower or to lift the door 64.

On the upper end of the mantel 30 where the top flange 32 is fastened a plate 85 is fastened forming the actual ceiling of the life saving chamber. It may be mentioned right here that between the ceiling 85 and the floor plate 49 a ring plate 86 is fastened to the mantel 30 at the height of the channel 66 at the door opening. Said ring shaped plate forms so to say a ledge and on this ledge as well as on the floor plate 49 seats 87 are fastened for the people to be saved.

Figure 9:
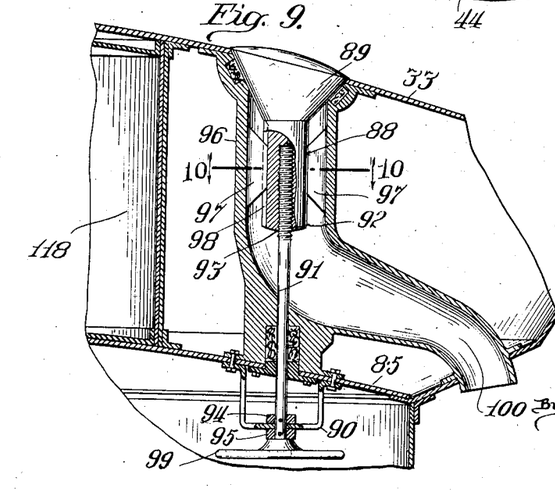
Figure 9 is a detail drawing showing a valve regulating the inflow of water for lifting the life saving device.
Figure 10:
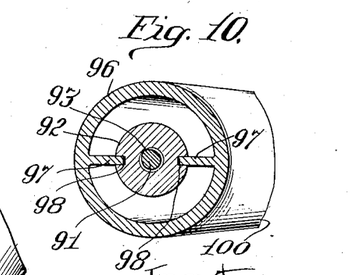
Figure 10 is a section on line 10—10 on Figure 5.
Figure 11:
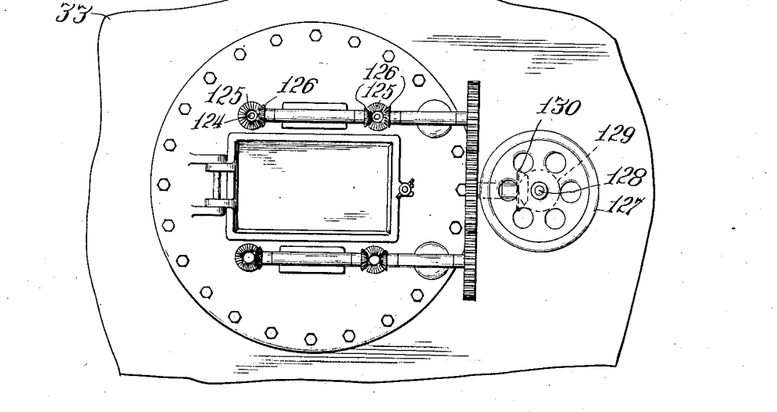
Fig. 11 is a bottom plan view of the mechanism used in elevating the lookout top.

When an accident happens to the boat, the people may go into the life saving device through the doorway 62 and 63, actuating the door closing mechanism as described and thereby close the doors 64 tight. It will be then necessary to let water flow into the casing 20 to reduce the working weight of the life saving device. For this purpose a plurality of valves 88 one of which is shown in detail in Figures 9 and 10 are provided in the top plate 33 and extend downwardly. The upper part 89 of the valve is cone shaped and on this portion a cylindrical part 92 is attached. The valve stem 91 extends downwardly through the ceiling plate 85 where it is rotatably held in a stirrup 90 fastened to said ceiling 85. On its upper ends the valve stem 91 is threaded, and the valve body 92 has a tapped bore 93. The thread on the stem corresponds with the thread in said bore. The stem 91 is held in the stirrup 92 by means of collars 94 and 95, so that stem may be rotated, but is prevented from longitudinal displacement. In the valve housing 96 ribs 97 are provided extending inwardly and engaging grooves 98 provided in the valve body 92 to secure the same against rotating movement. On the lower end of the valve stem a hand-wheel 99 is fastened whereby said stem may be rotated. A spout 100 is formed on the valve housing and extends, as shown in Figure 3, through the ring 32 outside of the mantel 30 of the life saving device. It is evident that, when in case of accident to the boat the valves 88 are opened, water will run into the casing 20, because the chute 100 opens into said casing. This water will tend to drive the life saving device upwardly, so that it will be easy to actuate the worm gear 38 for lifting the device out from the boat.

If the boat did sink into comparatively deep water, the lifting power of the water would be very strong, and the velocity, with which the device would be driven upwardly, would be very great. In order to regulate this velocity means are provided for increasing the pressure of the water above the device, and said means are shown best in Figure 3 of the drawings.

A false bottom 101 is shown in this figure located at a distance from the actual bottom 49. This false bottom 101 is as shown substantially dish-shaped. It is provided with a plurality of strengthening ribs 102 extending radially from the hub 103 of the said false bottom. Around said hub a plurality of openings 104 are provided, in said false bottom. The false bottom is fastened to a sleeve 105 which surrounds a vertical shaft 106, which is provided with outside thread, and the sleeve 105 is tapped, so that a rotation of the vertical shaft 106 will move the sleeve 105 and the false bottom 101 fastened thereto upwardly and downwardly respectively. The threaded shaft 106 extends as shown very plainly in Figures 3 and 8, through the hollow shaft 46 and beyond the same. Adjacent the upper end of the shaft 106 an internal gear 107 is fastened. On the wall 60 of the casing surrounding the mechanism for actuating the worm gears 38 and diametrically opposite from this mechanism a bracket 108 is fastened wherein a shaft 109 is journaled. On the upper end of said shaft a gear 110 is mounted meshing with the internal gear 107. The lower part of the shaft 109 is journaled in bearings 111 carried by standards 112 fastened to the floor plate 49. Above the bearings 11 a bevel gear 113 is mounted on the shaft 109 and meshes with a second bevel gear 114 mounted on a shaft journaled in the wall 60. On the outer end of said shaft extending through the wall a hand-wheel 115 is fastened. It is evident that by rotation of said hand-wheel the false bottom 101 may be moved upwardly and downwardly respectively. If as shown in Figure 3, the false bottom is at its lowermost position, a great quantity of water will be able to flow into the space between the bottom 49 and the false bottom 104, whereby the upward movement of the life saving device will be greatly reduced. The higher the false bottom is moved, the smaller this space between the two bottoms becomes, thereby reducing the quantity of water between said bottom and increasing the velocity of the upward movement of the life saving device. The water flows onto the concave false bottom and flows out of the holes 104.

Underneath the bottom 49 air-tight chambers 116 may be constructed. The construction of the walls of these chambers does not constitute any part of the life saving device proper and is therefore not described here.

Between the ceiling 85 and the top plate 33 a second series of air-tight chambers 118 may be provided. The two series of air-tight chambers may be used for the purpose of carrying compressed air for the people in the life saving chamber by conducting when the air in the life saving chamber is exhausted a fresh supply from one or the other of the air tight chambers by means pipe and valves, as indicated by 119.

Figure 5:
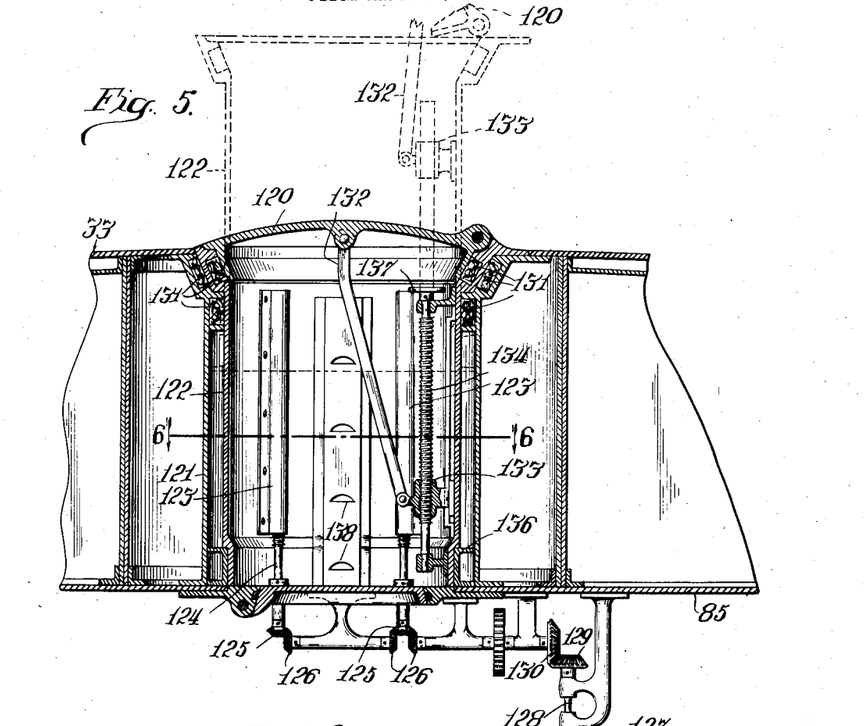
Figure 5 is a detail drawing of the look-out top of the life saving device and of the mechanism used to open said top and to extend the same as indicated in dotted lines.
Figure 6:
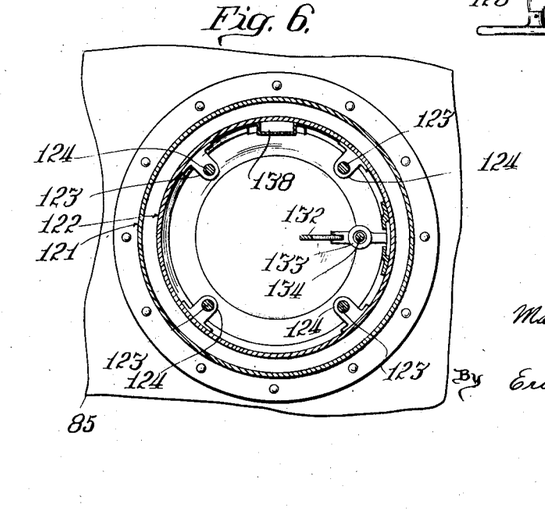
Figure 6 is a horizontal section on line 6—6 of Figure 5.

In order to take observations when the life saving device has reached the surface of the water, a look-out top is provided. The look-out is located between the ceiling 85 and the top 33. As shown in Figure 5 the look-out may be extended above the top to give a better chance of observation. For this purpose a casing 121 is built extending between the ceiling 85 and the top 33. Inside of this casing 121 a second cylindrical casing 122 is provided. On the inner surface of said second casing a plurality of threaded sleeves 123 are fastened. Threaded spindles 124 engage said sleeves and are journaled in the ceiling 85.

On the lower ends each of said spindles carries a bevel gear 125 meshing with another bevel gear 126 on a horizontal shaft. This shaft is driven as indicated in Figure 5 by means of a hand wheel 127, a shaft 128, a bevel gear 129 and a second bevel gear 130 mounted on the horizontal shaft. It is evident that by rotation of the hand wheel 127 the inner cylinder 122 may be moved upwardly and downwardly respectively in relation to the outer cylinder 121.

In order to keep the water from flowing into the space between the two cylindrical casings of the outlook a series of packings 131 may be provided. A trap-door 120 is hinged to the top of the inner cylinder 122, and a push rod 132 is hingedly fastened at the center of said trap-door. At the lower end of the rod 132 an internally threaded sleeve 133 is fastened and said sleeve rides on a vertical threaded spindle 134 journaled in bearings, 135 and 136 fastened to the inner surface of the cylindrical casing 122. A hand wheel 137 permits easy rotation of the spindle 134, whereby the sleeve 133 may be moved upwardly and downwardly respectively, so that the trap door 120 may be opened or closed by means of said described mechanism. Foot hold 138 may be provided on the inside wall of the cylinder 122 to make it easier to climb out on the outlook.

What I claim as new and desire to secure by Letters Patent is:

1. In a device of the class described, a relatively stationary outer shell, an inner shell arranged in said outer shell and spaced therefrom, means for holding said inner shell in the outer shell, the same means being adapted for forcing the inner shell out of the outer shell, means for guiding the inner shell during its movement relatively to the outer shell, a false bottom as means for regulating the velocity with which the inner shell will rise through the water after being released from the outer shell, said false bottom having a central opening therein, and means for adjusting the distance between the false bottom and the body of the inner shell.

2. In a device of the class described a relatively stationary outer shell, an inner shell arranged therein and spaced therefrom, means for holding the inner shell in position, the same means being adapted for forcing the inner shell out of the outer shell, means for guiding the inner shell during its movement in relation to the outer shell, a false bottom on the inner shell, means for regulating the velocity with which the inner shell will rise through the water after being released from the outer shell, means for adjusting the distance between the false bottom and the body of the inner shell, and a valve as means for conducting the water into the space between the inner and outer shell.

3. In a device of the class described, a relatively stationary inner shell arranged in said outer shell and spaced therefrom, means for holding said inner shell in position in said outer shell, the same means being adapted to force the inner shell out of the outer shell, means in the interior of the inner shell for actuating the means for forcing the inner shell out of the outer shell, means for regulating the velocity with which the inner shell will rise through water after being released from said outer shell, means in said inner shell for adjusting the distance between said regulating means and the body of the inner shell, means for conducting water into the space between the inner and outer shell, a compartment in said inner shell for receiving people to be saved, a second compartment adapted to receive compressed air, means connecting said two compartments, and means for regulating the flow of the air through said connecting means.

In witness whereof I affix my signature.

MARTIN J. REINHARD.